United States Patent [19]

Yamamoto et al.

[11] 4,290,090

[45] Sep. 15, 1981

[54] APPARATUS FOR AND METHOD OF NOISE-FREE DETECTION OF INTER-FEATURE PAUSES TO CONTROL SELECTIVE REPLAY IN TAPE RECORDING/REPRODUCTION SYSTEMS

[75] Inventors: Ryuji Yamamoto, Tonemachi; Kiyotaka Ohsawa, Kanamachi, both of Japan

[73] Assignee: Soundesign Corporation, Jersey City, N.J.

[21] Appl. No.: 133,821

[22] Filed: Mar. 25, 1980

[30] Foreign Application Priority Data

Mar. 28, 1979 [JP] Japan ............................. 54-39237[U]

[51] Int. Cl.³ ...................... G11B 15/16; G11B 15/52; G11B 19/10
[52] U.S. Cl. ................................... 360/72.1; 360/74.4
[58] Field of Search .................. 360/72.1, 72.2, 74.4, 360/71, 137, 73; 179/100.1 PS, 100.1 VC

[56] References Cited

U.S. PATENT DOCUMENTS

| Re. 30,416 | 10/1980 | Yasunaga | 360/72.1 |
| 3,723,666 | 3/1973 | Ferrari | 360/72.1 |
| 3,893,177 | 7/1975 | Takenaka | 360/72.1 |
| 3,918,086 | 11/1975 | Blackie et al. | 360/74.4 |
| 4,195,319 | 3/1980 | Ida | 360/72.1 |
| 4,228,471 | 10/1980 | Shiga | 360/72.1 |

Primary Examiner—Alfred H. Eddleman
Attorney, Agent, or Firm—Kirschstein, Kirschstein, Ottinger & Cobrin

[57] ABSTRACT

Recorded features on a recording medium have inter-feature pauses which must be reliably detected in order to control the selective replay of the features. Certain noise signals located within an inter-feature pause complicate the detection of the latter. These noise signals include low-frequency signals which have high voltage levels at playback speed, and middle- and high-frequency signals which have high voltage levels at fast forward or rewind speed. These high voltage levels of the noise signals could be mistaken for audio signals. A signal-processing circuit filters the noise signals from the audio signals. A control circuit changes the impedance of the signal-processing circuit such that the signals are filtered according to a first predetermined filter characteristic when the recording medium advances at playback speed, and according to a different second predetermined filter characteristic when the recording medium advances at fast forward or rewind speed. The filter characteristics attenuate the high voltage levels of the noise signals to low voltage levels, thereby preventing the noise signals from being mistaken for audio signals at the playback or fast forward or rewind speeds.

10 Claims, 17 Drawing Figures

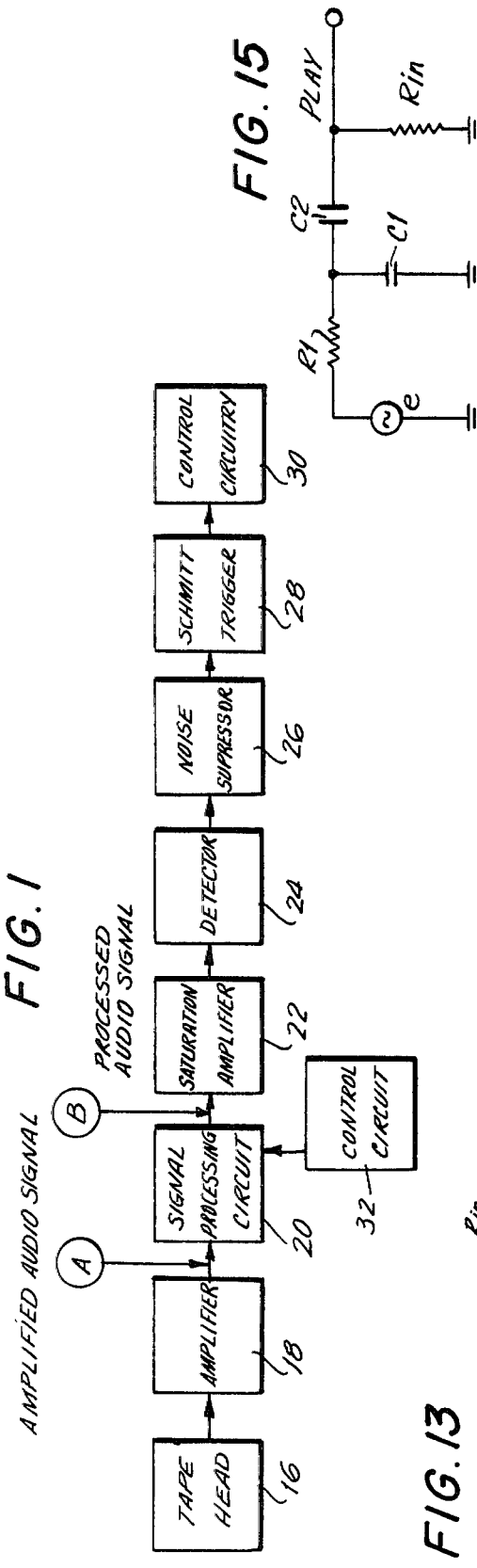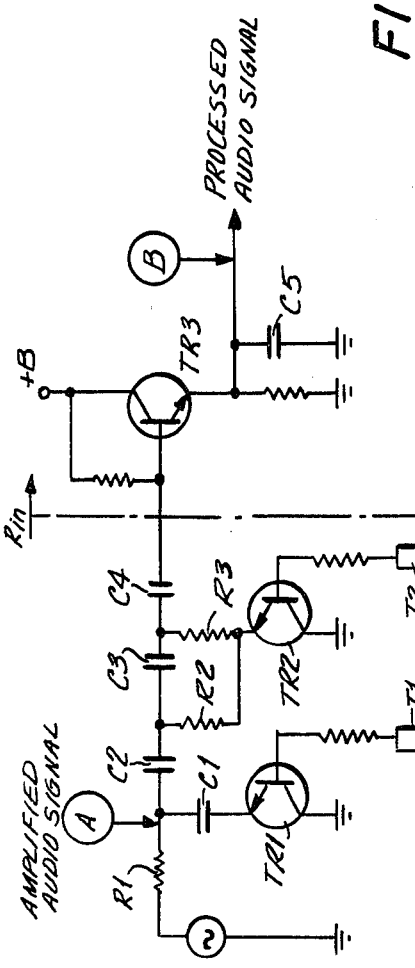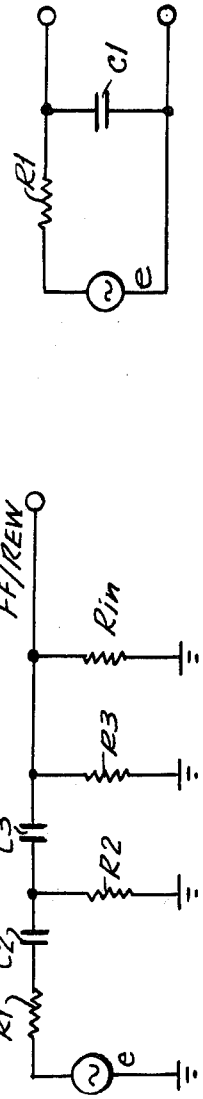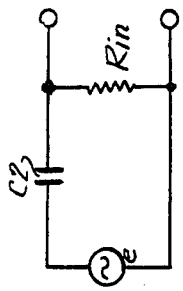

FLAT AMPLIFIED AUDIO SIGNAL (PLAY)

EQUALIZED AMPLIFIED CHARACTERISTIC

EQUALIZED AMPLIFIED AUDIO SIGNAL (PLAY)

FILTER CHARACTERISTIC (PLAY)

PROCESSED AUDIO SIGNAL (PLAY)

FLAT AMPLIFIED AUDIO SIGNAL (FF/REW 25X)

FLAT AMPLIFIED AUDIO RESPONSE SIGNAL (FF/REW 10X)

EQUALIZED AMPLIFIED AUDIO SIGNAL (FF/REW 25X)

EQUALIZED AMPLIFIED AUDIO SIGNAL (FF/REW 10X)

FILTER CHARACTERISTIC (FF/REW)

PROCESSED AUDIO SIGNAL (FF/REW)

APPARATUS FOR AND METHOD OF NOISE-FREE DETECTION OF INTER-FEATURE PAUSES TO CONTROL SELECTIVE REPLAY IN TAPE RECORDING/REPRODUCTION SYSTEMS

BACKGROUND OF THE INVENTION

1. Field of the Invention

This invention generally relates to tape recording/reproduction systems of the type having the capability of automatically finding a feature recorded on the magnetic type by detecting the inter-feature pauses between the recorded features, and thereupon of precisely positioning the selected feature relative to the tape head for replay.

More particularly, this invention relates to an improved apparatus for, and method of, reliably detecting, in a noise-free manner, inter-feature pauses between features in order to accurately control the selective replay of the recorded features.

2. Description of the Prior Art

Many features or programs are recorded on a recording medium such as a magnetic recording tape. Automatic feature finder systems have been proposed to replay on tape recording/reproduction systems features which have been pre-selected by the listener, while bypassing other features.

These automatic feature finder systems operate by detecting the inter-feature pauses, i.e. the blank areas between successive features on the tape on which no signals were recorded, while the tape is advancing at fast forward or rewind speed. The detected inter-feature pauses are then used to precisely position the selected feature at its beginning at the playback head, and to concomitantly change the tape speed to the playback speed. The number of inter-feature pauses is used to select from a plurality of recorded features just what features are to be selectively played, and in what order the selected features are to be played.

However, the automatic feature finder system may malfunction when noise signals are located within an intra-feature pause. At certain tape speeds, the voltage amplitude levels of the noise signals can exceed a predetermined voltage level which is used to indicate the presence of a feature. Hence, in some cases, the noise signals within a pause can cause the system to mistake the pause for a feature itself.

To explain in more detail, the playback head senses the tape and detects features and pauses thereon. The playback head generates electrical audio signals whenever it detects a feature. When the head detects a pause, no audio signals are generated. Low frequency noise signals are superimposed over the audio signal and within the pause. All of these signals are typically successively amplified, filtered, saturated, detected, noise-suppressed and conducted to a schmitt trigger circuit to generate a pulsed information signal, as described in detail in the co-pending U.S. application Ser. No. 133,731, filed Mar. 25, 1980, entitled "Apparatus for and Method of Distinguishing Pauses To Control Selective Replay in Tape Recording/Reproduction Systems," by Yamamoto, Nakahara and Kasai, the entire contents of which are hereby incorporated by reference.

In operation, the schmitt trigger circuit generates an output pulse whenever the input audio signal exceeds a predetermined threshold voltage value, thereby indicating the presence of a feature. Whenever the input signal is lower than the threshold value, then this condition represents the presence of a pause. If any noise signal is present within the pause, then the voltage levels of the noise signals must be lower than the threshold value, or else the schmitt trigger circuit will be triggered to falsely indicate that a feature, rather than a pause, is present.

Certain low-frequency noise signal levels within a pause are above the threshold value of the schmitt trigger circuit when the tape is in the play mode. At the fast forward or rewind modes, there are middle- and high-frequency noise signals which have amplitude levels above the aforementioned threshold value. At these faster speeds, the magnetic flux on the tape changes more rapidly with time and, in turn, the voltage levels of the audio and noise signals, as detected by the playback head, increase. The increased voltage levels for the various frequency noise signals in the playback or fast forward or rewind mode therefore lead to the false indication of a feature when, in fact, a pause is present on the tape. If even one inter-feature pause is missed by the detection circuitry, then the entire system will not selectively replay the features as desired by the listener.

SUMMARY OF THE INVENTION

1. Objects of the Invention

Accordingly, it is the general object of the present invention to overcome the aforementioned drawbacks of the prior art.

Another object of the present invention is to reliably detect inter-feature pauses in a noise-free manner.

Still another object of the invention is to reliably distinguish inter-feature pauses from the features themselves at all speeds of advancement of the recording tape.

A further object of this invention is to eliminate a source of system malfunction due to noise in the inter-feature pauses.

An additional object of this invention is to provide a novel apparatus for, and method of, reliably processing audio and noise signals in an automatic feature finding circuit of tape recording/reproduction systems.

2. Features of the Invention

In keeping with these objects and others which will become apparent hereinafter, one feature of the invention resides, briefly stated, in an apparatus for, and method of, reliably detecting inter-feature pauses between features in recording/reproduction systems of the type in which the recording medium, i.e. tape, may be advanced at any one of a selected playback speed, fast forward speed and rewind speed. Specifically, the system is of the type which selectively replays features recorded on the tape in response to detection of the inter-feature pauses.

The invention includes recording head sensor means, i.e. a tape playback head, for detecting the features and pauses on the tape. The tape head detects audio signals whose voltage amplitudes are above a predetermined threshold voltage value to thereby indicate the presence of a feature on the tape. The tape head also detects inter-feature pauses by not detecting any audio signal. Put another way, the tape head detects non-audio signals whose voltage amplitudes are below the threshold value to thereby indicate the presence of an inter-feature pause.

Still further, the tape head detects noise signals, some of which may be located within the inter-feature pause. Certain low-frequency noise signals within the pause have voltage amplitudes above the threshold value at playback speed. At the increased tape speeds of fast forward and rewind, there are middle- and high-frequency noise signals within the pause which have voltage amplitudes above the threshold value. These high voltage amplitudes of the noise signals exceed the threshold value, thereby leading the detection apparatus to falsely conclude that this "noisy" pause is a feature.

This invention eliminates this potential source of malfunction. The noise signals are filtered from the audio signals by a first signal-processing circuit according to a first predetermined filter characteristic when the tape advances at the playback speed. The noise signals are filtered from the audio signals by a second signal-processing circuit according to a second predetermined filter characteristic when the tape advances at either the fast forward or rewind speed. The first and second signal-processing circuits are in reality a single circuit whose impedance is changed between the first and second filter characteristics in dependence on the tape speed.

At the playback speed, the first filter characteristic attenuates and filters the low-frequency noise signals to voltage amplitudes less than the threshold value. At the fast forward or rewind speeds, the second filter characteristic attenuates the middle- and high-frequency noise signals to voltage amplitudes less than the threshold value. These actions assure that a "noisy" pause can never be mistaken for a feature.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a schematic block diagram of the improved apparatus for, and method of, reliably detecting inter-feature pauses between features on a recording medium in a tape recording/reproduction system in accordance with this invention;

FIG. 13 is an electrical circuit diagram of the signal-processing circuit and control circuit of FIG. 1;

FIG. 14 is the simplified equivalent circuit of FIG. 13 in the fast forward or rewind mode which creates the frequency response characteristic of FIG. 11;

FIG. 15 is the simplified equivalent circuit of FIG. 13 in the playback mode which creates the frequency response characteristic of FIG. 5;

FIG. 16 is the still further simplified equivalent circuit of the circuit of FIG. 15 at the lower cut-off frequency of 100 Hz;
and FIG. 17 is the still further simplified equivalent circuit of the circuit of FIG. 15 at the higher cut-off frequency of 2 KHz.

DETAILED DESCRIPTION OF THE PREFERRED EMBODIMENTS

Figure 2:
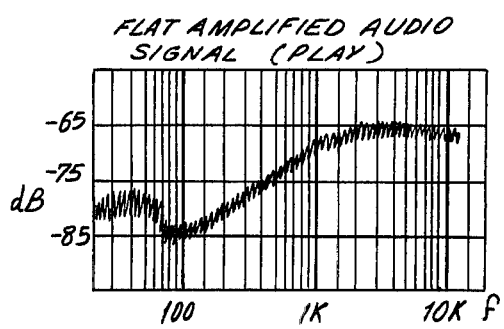
FIG. 2 is the frequency response of the amplified audio signal A of FIG. 1 at playback and when the amplifier of FIG. 1 has a flat frequency characteristic.

A plurality of programs or features are recorded on a recording medium such as a magnetic recording tape. These features may be composed of music, vocal renditions, speech, or any other recordable information or intelligence.

These features are separated by inter-feature pauses between features. Typically, the features are recorded such that the inter-feature pauses have a time duration of about three seconds as measured when the tape is advancing at playback speed.

Inter-feature pauses are different from intra-feature pauses which are located within, and occur during, a feature. Intra-feature pauses may be breaks or short intermissions in the performance of music or rendition of speech, or may be passages of very low volume. Intra-feature pauses have time durations which are less than three seconds as measured when the tape is advancing at playback speed.

In order to effect the selective replay of certain recorded features on the tape for tape recording/reproduction systems, such as cassette tape recorders or cassette tape decks, while bypassing other features, it is necessary to generate an output control signal in response to detection of the inter-feature pauses. Hence, it is important to reliably detect inter-feature pauses.

As discussed in detail in the above-identified pending U.S. application filed by YAMAMOTO, NAKAHARA and KASAI, the entire contents of which are herewith incorporated by reference, the tape recording/reproduction system includes recording medium sensor circuitry for detecting the recorded features and the pauses on the tape. As shown in FIG. 1, the recording medium sensor circuitry includes a playback/recording tape head 16 for sensing the features and pauses on the tape, and operative for generating an electrical audio signal which is amplified by a recording/playback amplifier 18. The amplified audio signal A is next conducted to a signal-processing circuit, typically a bandpass filter 20, which rejects noise, and thereupon the processed audio signal B is conducted to a saturation amplifier 22.

The saturated audio signal is characterized by a high voltage amplitude when an audio signal is present, and by a low voltage amplitude when no recorded signal (i.e. a pause) is present.

The saturated signal is next conducted to a detector 24 which cuts off the negative-going portions of the saturated signal, and thereupon is conducted to a noise suppression circuit 26 wherein certain noise pulses within a pause are eliminated. Thereupon, the signal is conducted to a schmitt trigger circuit 28 which generates an information signal shaped as a pulse train. The schmitt trigger circuit has a predetermined threshold voltage value. If the input audio signal to the schmitt trigger circuit has a voltage amplitude greater than the threshold value, then a positive pulse indicating the presence of a feature is generated. If the input audio signal has a voltage amplitude less than the threshold value, then no pulse is generated, thereby indicating the presence of a pause.

The pulsed information signal is then fed to control circuitry 30 which generates an output control signal whenever an inter-feature pause is determined. Further details on the operation of the tape head 16, amplifier 18, saturation amplifier 22, detector 24, noise suppressor 26, schmitt trigger 28 and control circuitry 30 can be obtained from the aforementioned patent application, and are not believed to be necessary for an understanding of this invention which relates more particularly to the signal-processing circuit 20 and to its associated control circuit 32.

The signal-processing circuit 20 and control circuit 32 therefor are concerned with eliminating the above-described source of apparatus malfunction, i.e. the mistaking of a pause having noise therein for a feature itself, in either the playback or the fast forward or rewind mode of operation.

As noted above, the tape head 16 detects audio signals to indicate features and non-audio signals (i.e. no signals) to indicate pauses. Features are distinguished from pauses in the schmitt trigger circuit 28 depending upon whether the detected signals have a voltage amplitude above or below the threshold voltage level of the schmitt trigger.

The tape head 16 also unavoidably detects undesirable noise signals. These noise signals are derived from many sources. For example, in the playback mode, low-frequency noise signals derive from leakage magnetic flux resulting from activation of the head plunger or from any of the other plungers, residual noise resulting from bulk erase using a 60 Hz power supply, hum, power supply fluctuations for the recording or erase bias power supply, and rumble noise resulting from a turntable.

At the fast forward or rewind speeds, the tape travels from about ten times faster than the playback speed (at the beginning of the tape) to about twenty-five times faster than the playback speed (at the end of the tape). These increased speeds increase the change in magnetic flux on the tape and, in turn, increase the voltage levels of the audio signals and, more importantly, of the noise signals. The above-described low-frequency noise signals are upscaled in frequency due to the increased tape speed and now constitute middle-frequency signals.

High-frequency noise signals are derived from residual magnetic flux at the increased tape speeds in the fast forward or rewind modes.

The voltage amplitudes of the above-described low-, middle-, and high-frequency noise signals within a pause exceed the threshold voltage value of the schmitt trigger, and thereby trigger the latter to indicate that a feature is present, when in reality a pause is present.

To explain in more detail, reference now is respectfully directed to the amplitude (dB) versus frequency (f) characteristic graphs illustrated in FIGS. 2–12.

FIG. 2 shows the frequency response of the amplified audio signal A of FIG. 1 at playback when the amplifier 18 is provided with a flat frequency characteristic. It will be noted that the sensitivity of the tape head increases in proportion to the frequency of the audio signal. The low-frequency noise signals are below 100 Hz and are centered at about 60 Hz.

Figure 3:
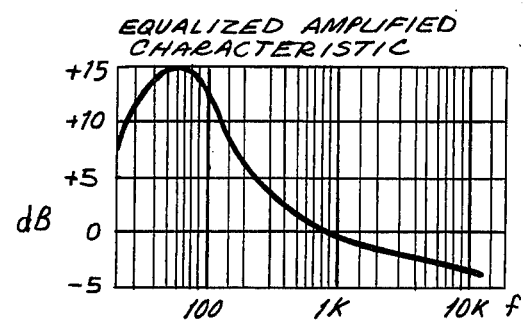
FIG. 3 is the frequency characteristic of the amplifier of FIG. 1 when it is provided with an equalized frequency characteristic.

FIG. 3 is the frequency characteristic of the amplifier 18 when it is provided with an equalized frequency characteristic. This equalized characteristic is used to compensate for the tape head response characteristic and to generate an overall more flat playback frequency response for the audio signals.

Figure 4:
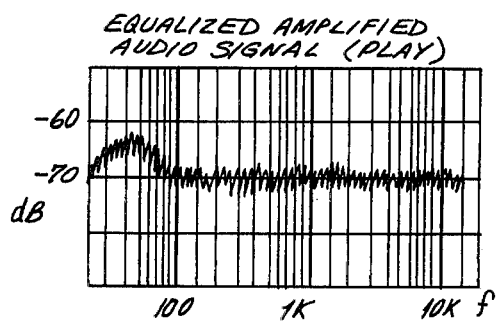
FIG. 4 is the frequency response of the amplified audio signal A of FIG. 1 at playback and after amplification with the equalized characteristic of FIG. 3.

FIG. 4 shows the frequency response of the amplified audio signal A at playback and after it has been amplified by the equalized amplifier 18 having the characteristic shown in FIG. 3. The frequency spectrum is suppressed to be nearly flat through the entire frequency band, but the low-frequency noise signals still exist around 60 Hz. These low-frequency noise signals have amplitudes which would falsely trigger the schmitt circuit if they were located within a pause. It is therefore desired to filter out these low-frequency noise signals.

Figure 5:
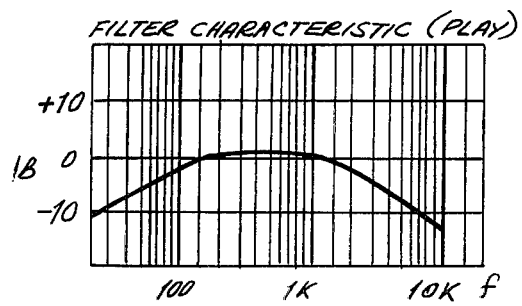
FIG. 5 is the frequency characteristic of the signal-processing circuit of FIG. 1 upon selection of the playback mode.

FIG. 5 is the desired frequency response characteristic for the signal-processing circuit 20 in the playback mode. It is a bandpass filter characteristic having a lower cut-off frequency of about 100 Hz, a higher cut-off frequency of about 2 KHz, and about zero attenuation in the passband.

Figure 6:
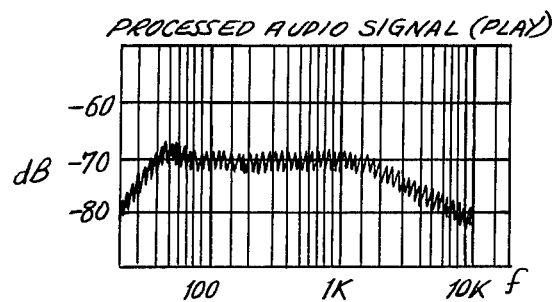
FIG. 6 is the frequency response of the processed audio signal B of FIG. 1 when the amplified audio signal A of FIG. 4 is processed through the signal-processing circuit of FIG. 5 in the playback mode.

FIG. 6 shows the overall frequency response of the processed audio signal B when the amplified audio signal of FIG. 4 is processed through the signal processing circuit having the characteristic shown in FIG. 5. It is noted that the low-frequency noise signals at 60 Hz have been attenuated to amplitudes below the threshold value, and any high-frequency noise signals have also been attenuated.

Figure 8:
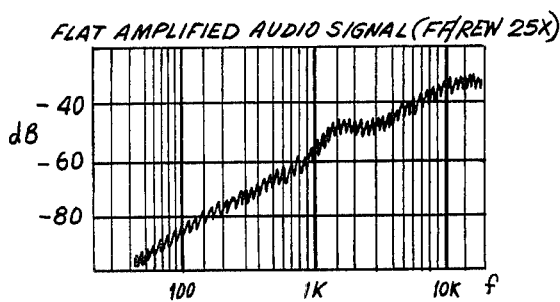
FIG. 8 is the frequency response of the amplified audio signal A of FIG. 1 at a fast forward or rewind speed which is twenty-five times that of the playback speed when the amplifier of FIG. 1 has a flat frequency characteristic.
Figure 7:
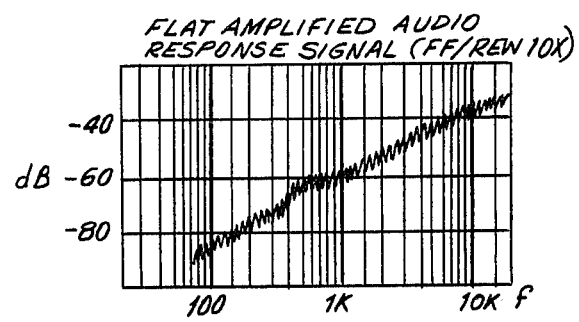
FIG. 7 is the frequency response of the amplified audio signal A of FIG. 1 at a fast forward or rewind speed which is ten times that of the playback speed when the amplifier of FIG. 1 has a flat frequency characteristic.

At the faster speeds of the fast forward and rewind modes, the tape head sensitivity increases as a function of the tape speed. FIG. 7 and FIG. 8, respectively, show the frequency responses of the amplified audio signal A after the latter has passed through a flat amplifier at ten times and at twenty-five times, respectively, of the playback speed. In FIG. 7, the low-frequency 60 Hz noise signals have been upscaled to middle frequencies which are centered at about 600 Hz, and in FIG. 8 the low frequency 60 Hz noise signals have been upscaled to middle frequencies which are centered at about 1.5

KHz. The frequency upscaling of the noise signals is proportional to the increase in tape speed.

Figure 10:
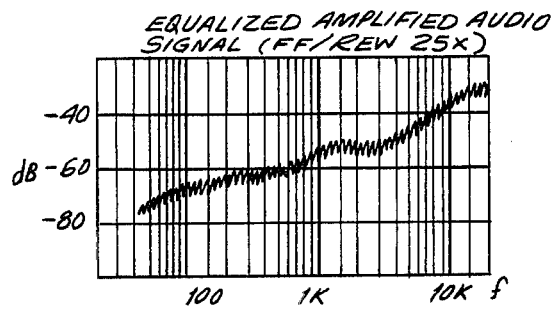
FIG. 10 is the frequency response of the amplified audio signal A of FIG. 1 at a fast forward or rewind speed which is twenty-five times that of the playback speed when the amplifier of FIG. 1 has the equalized frequency characteristic of FIG. 3.
Figure 9:
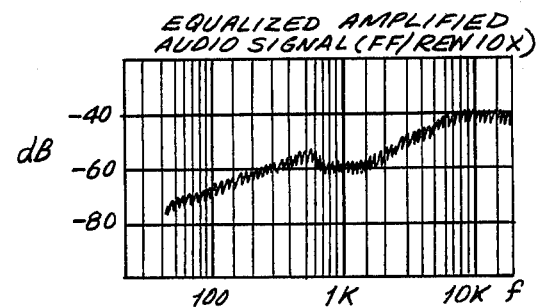
FIG. 9 is the frequency response of the amplified audio signal A of FIG. 1 at a fast forward or rewind speed which is ten times that of the playback speed when the amplifier of FIG. 1 has the equalized frequency characteristic of FIG. 3.

Similarly, FIGS. 9 and 10 are analogous to FIGS. 7 and 8, except that the amplified audio signal A is amplified not through a flat amplifier, but through an equalized amplifier having the frequency characteristic shown in FIG. 3. The middle frequency noise signals at about 600 Hz and at about 1.5 KHz have high voltage amplitudes which would falsely trigger the schmitt circuit. Hence, these middle frequency noise signals must be attenuated.

FIGS. 9 and 10 also show high frequency noise signals above 4 KHz which also have high voltage amplitudes which would falsely trigger the schmitt circuit.

Figure 11:
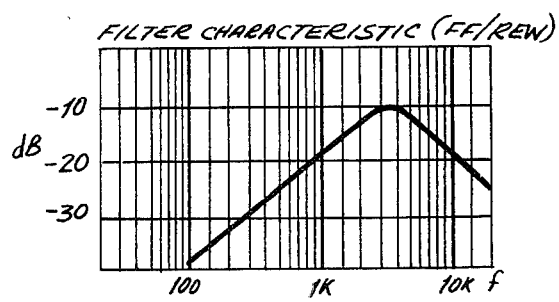
FIG. 11 is the frequency characteristic of the signal-processing circuit of FIG. 1 upon selection of the fast forward or rewind mode.

FIG. 11 is the frequency characteristic of the signal-processing circuit of FIG. 1 upon selection of the fast forward or rewind modes. This is a bandpass-type filter characteristic which peaks at about 4 KHz and has about 10 dB more attenuation at the peak as compared to the passband of the bandpass filter characteristic of FIG. 5. About 20 dB worth of attenuation is necessary to attenuate the noise signals at the fast forward and rewind modes to insure that the amplitudes of the noise signals are below the threshold value of the schmitt trigger. However, the bandpass filter need only contribute 10 dB, because an extra 10 dB is automatically obtained due to the loss of soft contact of the tape against the head at the fast forward and rewind modes of operation.

The filter characteristic of FIG. 11 has a lower skirt portion (100 Hz to 4 KHz) which attenuates the middle frequency noise signals at 600 Hz or 1.5 KHz and also has an upper skirt portion (4 KHz and above) which attenuates the high frequency noise signals above 4 KHz. The attenuation introduced by the filter characteristic of FIG. 11 causes these noise signals in the fast forward or rewind mode to have a voltage amplitude less than the aforementioned threshold value.

Figure 12:
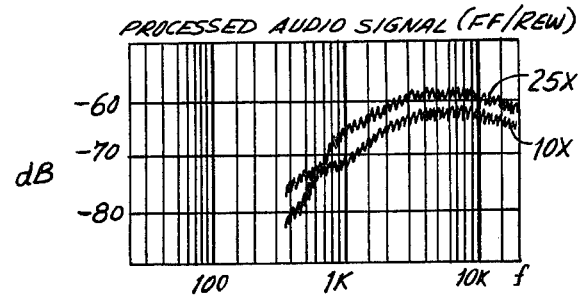
FIG. 12 shows the frequency responses of each processed audio signal B of FIG. 1 when the amplified audio signals A of FIGS. 9 and 10 are respectively processed through the signal-processing circuit of FIG. 1 in the fast forward and rewind modes at both ten times and twenty-five times the speed of the playback mode.

FIG. 12 shows the frequency responses of the processed audio signal B after the amplified audio signals of FIGS. 9 and 10 have been processed through the signal-processing circuit 20 when the latter has the frequency response characteristic of FIG. 11. The additional attenuation in the fast forward and rewind modes assures that any middle and high frequency noise signals within an inter-feature pause will be attenuated. The filtered noise signals will therefore not trigger the schmitt trigger circuit 28, and thus eliminate this source of apparatus malfunction.

FIG. 13 shows the preferred signal-processing and control circuitry for obtaining the above results. The amplified audio signal A is generated by the function generator e and the resistor R1. Capacitor C1 is connected to the emitter of control transistor TR1. The base of TR1 is connected to control terminal T1; the emitter of TR1 is connected to ground.

Capacitors C2, C3 and C4 are connected in series between the resistor R1 and the base of buffer transistor TR3. Resistor R2 is connected between capacitors C2, C3 and the emitter of control transistor TR2. Resistor R3 is connected between capacitors C3, C4 and the emitter of control transistor TR2. The base of TR2 is connected to control terminal T2; the emitter of TR2 is connected to ground.

Buffer transistor TR3 has capacitor C5 connected between its emitter and ground. The processed audio signal is taken off from capacitor C5.

The values of capacitors C1, C2, C3, C5 and of resistors R1, R2 and R3 are chosen to constitute a bandpass filter having the characteristic shown in FIG. 11 for the fast forward or rewind mode. This is obtained by applying a high voltage signal to control terminal T2 which causes transistor TR2 to conduct and, in turn, connects R2 and R3 to ground. Concomitantly, a low voltage signal is applied to control terminal T1 which causes transistor TR1 to turn off and, in turn, C1 is not grounded. The input impedance or resistance $R_{IN}$ of the buffer amplifier TR3 is chosen to be many times greater than the impedance of capacitor C4 (namely, $$R_{IN} >> \frac{1}{2\pi f C_4}),$$

),
and therefore, the simplified equivalent circuit of FIG. 14 results.

In the equivalent circuit of FIG. 14, the following conditions are met:

$R_{IN} >> R3$ $R_{IN} >> R2$.

It can be seen that the impedance of capacitors C2 and C3 decreases as a function of frequency, and therefore the processed output signal increases as the frequency increases. However, capacitors C2 and C3 are chosen to give 10 dB attenuation at a frequency of about 4 KHz (See FIG. 11). Capacitor C5 acts as a bypass capacitor for frequencies above 4 KHz.

In the play mode, a high voltage signal is applied to control terminal T1 and a low voltage signal is applied to control terminal T2. Transistor TR1 turns on, and transistor TR2 turns off. The components of the circuit of FIG. 13 satisfy the following conditions:

$$\frac{1}{2\pi f_1 C_4} << R \text{ in}$$
$$R_2 + R_3 \approx \frac{1}{2\pi f_1 C_3}$$
$$R_2 + R_3 << R \text{ in}$$

where $f_1$ = the lower cut-off frequency.

Hence, the circuit of FIG. 13 may be simplified to the equivalent circuit of FIG. 15. In order to further simplify the FIG. 15 circuit, the following conditions have been established for the lower cut-off frequency being about 100 Hz:

$$R \text{ in} = \frac{1}{2\pi f_1 C_2}$$
$$\frac{1}{2\pi f_1 C_1} >> R_{in} - \gamma \frac{1}{2\pi f_1 C_2}$$
$$R_1 << R_{in} - \gamma \frac{1}{2\pi f_1 C_2}$$

Hence, the FIG. 15 circuit can be further simplified to the circuit shown in FIG. 16 from which it may be noted that the output voltage decreases as the frequency decreases to reject the lower frequencies, as best shown in FIGS. 5 and 6.

If the higher cut-off frequency is about 2 KHz, then the FIG. 15 circuit can be further simplified to the circuit shown in FIG. 17, because the following conditions have been established:

$$R_1 = \frac{1}{2\pi f_2 C_1}$$

$$\frac{1}{2\pi f_2 C_2} << R \text{ in}$$

$$\frac{1}{2\pi f_2 C_1} << R \text{ in}$$

where $f_2$ = the higher cut-off frequency.

It will be noted from the FIG. 17 circuit that the output signal decreases as the frequency increases above the higher cutoff frequency, as best shown in FIGS. 5 and 6.

The control circuit 32 therefore changes the impedance of the resistive and reactive elements of the signal-processing circuit such that the latter has the filter characteristic shown in FIG. 5 in the play mode, and the filter characteristic shown in FIG. 12 in the fast forward and rewind modes. Low-, middle- and high-frequency noise signals are rejected at their respectively-associated speeds when they appear within an inter-feature pause.

It will be understood that each of the elements described above, or two or more together, may also find a useful application in other types of constructions differing from the types described above.

While the invention has been illustrated and described as embodied in an apparatus for and method of noise-free detection of inter-feature pauses to control selective replay in tape recording/reproduction systems, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. In a recording/reproduction system for selectively replaying features recorded on a recording medium, and for advancing the recording medium at any one of a selected playback speed, fast forward speed and rewind speed,
    an improved apparatus for reliably detecting interfeature pauses between features to control the selective replay of the recorded features, said apparatus including recording head sensor means operative for detecting
    audio signals whose voltage amplitudes are above a predetermined voltage value to indicate the presence of features,
    non-audio signals whose voltage amplitudes are below the predetermined voltage value to indicate the presence of inter-feature pauses, and
    noise signals located within the inter-feature pauses and having voltage amplitudes above the predetermined voltage value at all advancement speeds of the recording medium, thereby resulting in apparatus malfunction in distinguishing between an inter-feature pause and a feature itself,
    the improvement comprising:
        (a) first signal-processing means for attenuating the noise signals to voltage amplitudes less than said predetermined voltage value in accordance with a first predetermined frequency response characteristic;
        (b) second signal-processing means for attenuating the noise signals to voltage amplitudes less than said predetermined voltage value in accordance with a second predetermined frequency response characteristic; and
        (c) control means for selecting said first signal-processing means when the recording medium advances at playback speed, and for alternately selecting said second signal-processing means when the recording medium advances at fast forward or rewind speed to thereby eliminate the aforementioned apparatus malfunction.

2. The improvement defined in claim 1, wherein the noise signals include low-frequency noise signals at playback speed, and middle- and high-frequency noise signals at fast forward or rewind speed; and wherein said first signal-processing means attenuates the low-frequency noise signals, and wherein said second signal-processing means attenuates the middle- and high-frequency noise signals.

3. The improvement defined in claim 2, wherein the low-frequency signals are centered at about 60 Hz, and the middle-frequency signals are centered from about 600 Hz to about 1.5 KHz, and the high-frequency signals are centered at about 4 KHz.

4. The improvement as defined in claim 1, wherein said first frequency response characteristic is a band-pass-type filter characteristic, and wherein said second frequency response characteristic has a peak value for its passband.

5. The improvement as defined in claim 1, wherein said first frequency response characteristic filters noise signal frequencies below about 100 Hz and above about 2 KHz; and wherein said second frequency response characteristic filters noise signal frequencies below about 4 KHz and above about 4 KHz.

6. The improvement as defined in claim 4, wherein said second signal-processing means attenuates the noise signal frequencies at its peak about 10 dB more than the noise signals in the respective passband of the first signal-processing means.

7. The improvement as defined in claim 1, wherein said first signal-processing means and said second signal-processing means together comprise a single signal-processing circuit comprised of resistive and reactive components; and wherein said control means is operative to differently change the circuit impedance in dependence upon the advancement speed of the recording medium.

8. In a recording/reproduction system for selectively replaying features recorded on a recording medium, and for advancing the recording medium at any one of a selected playback speed, fast forward speed and rewind speed,
    an improved method of reliably detecting inter-feature pauses between features to control the selective replay of the recorded features, said improved method including the step of detecting
    audio signals whose voltage amplitudes are above a predetermined voltage value to indicate the presence of features, non-audio signals whose voltage amplitudes are below the predetermined voltage value to indicate the presence of inter-feature pauses, and noise signals located within the inter-feature pauses and having voltage amplitudes above the predetermined voltage value at all advancement speeds of the recording medium, thereby resulting in system malfunction in distinguishing between an inter-feature pause and a feature itself, the improved method comprising the steps of:
  (a) attenuating the noise signals to voltage amplitudes less than said predetermined voltage value in accordance with a first predetermined frequency response characteristic;
  (b) attenuating the noise signals to voltage amplitudes less than said predetermined voltage value in accordance with a second predetermined frequency response characteristic; and
  (c) selecting step (a) when the recording medium advances at playback speed, and alternately selecting step (b) when the recording medium advances at fast forward or rewind speed to thereby eliminate the aforementioned system malfunction.

9. The improvement as defined in claim 8, wherein said filtering steps are performed in a single signal-processing circuit, and wherein said selecting step is performed by differently changing the circuit impedance in dependence upon the advancement speed of the recording medium.

10. The improvement as defined in claim 8, wherein the noise signals include low-frequency noise signals at playback speed, and middle- and high-frequency noise signals at fast forward or rewind speed; and wherein step (a) is performed by attenuating the low-frequency signals, and wherein step (b) is performed by attenuating the middle- and high-frequency signals.

* * * * *